United States Patent

Hayata

(10) Patent No.: US 7,054,347 B2
(45) Date of Patent: May 30, 2006

(54) COMMUNICATION APPARATUS

(75) Inventor: Toshihiro Hayata, Tokyo (JP)

(73) Assignee: NEC Corporation, Tokyo (JP)

( * ) Notice: Subject to any disclaimer, the term of this patent is extended or adjusted under 35 U.S.C. 154(b) by 1079 days.

(21) Appl. No.: 09/899,840

(22) Filed: Jul. 9, 2001

(65) Prior Publication Data

US 2002/0003791 A1    Jan. 10, 2002

(30) Foreign Application Priority Data

Jul. 7, 2000    (JP) .............................. 2002-206132

(51) Int. Cl.
  *H04B 1/69*    (2006.01)
  *H04B 1/707*    (2006.01)
  *H04B 1/713*    (2006.01)

(52) U.S. Cl. ...................... 375/130; 375/260; 375/343; 375/367

(58) Field of Classification Search ................ 327/164; 370/203; 375/130, 260, 285, 343, 367; 455/42–45
See application file for complete search history.

(56) References Cited

U.S. PATENT DOCUMENTS

| | | | | |
|---|---|---|---|---|
| 6,324,160 B1* | 11/2001 | Martin et al. | ................ | 370/209 |
| 6,768,729 B1* | 7/2004 | Ohsuge | ....................... | 370/342 |
| 2001/0050950 A1* | 12/2001 | Sato | ........................... | 375/150 |
| 2002/0122557 A1* | 9/2002 | Aihara et al. | ................ | 380/261 |

FOREIGN PATENT DOCUMENTS

| | | |
|---|---|---|
| EP | 0 718 998 A2 | 6/1996 |
| EP | 0 940 926 A2 | 9/1999 |
| EP | 1 052 783 A2 | 11/2000 |
| EP | 1 069 696 A1 | 1/2001 |
| JP | A 8-181636 | 7/1996 |
| JP | A 10-271034 | 10/1998 |
| JP | A 11-27180 | 1/1999 |
| JP | A 11-187450 | 7/1999 |
| JP | A 11-274982 | 10/1999 |
| JP | A 2000-4211 | 1/2000 |
| JP | A 2000-151466 | 5/2000 |
| WO | 99/37037 | 7/1999 |
| WO | 99/63677 | 12/1999 |

* cited by examiner

*Primary Examiner*—Stephen Chin
*Assistant Examiner*—Erin M. File
(74) *Attorney, Agent, or Firm*—Young & Thompson

(57) ABSTRACT

Signals sent from a sender by a code division multiple access communication system are input respectively into first to Mth delay units which are disposed parallel to one another. The correlation is examined in each correlator, and the results of a predetermined number of times of correlation are averaged in each averaging section. Based on this, path detection is carried out in each path detector. The results of path detection are input into a correlator control unit which performs control in such a manner that the number of times of averaging in an averaging section is smaller for a higher correlation value.

14 Claims, 7 Drawing Sheets

COMMUNICATION APPARATUS

FIELD OF THE INVENTION

The invention relates to a communication apparatus using a code division multiple access system, and more particularly to a communication apparatus which can realize improved path detection efficiency.

BACKGROUND OF THE INVENTION

In a code division multiple access (hereinafter referred to as "CDMA") communication system, after modulation of a signal to be sent, the signal is multiplied by a diffusion code to perform spectral diffusion, followed by sending the multiplied signal to a destination. On the destination side, before demodulation, the received signal is again multiplied by a code, to perform reverse diffusion to reproduce the signal sent from the send side. The diffusion code used on the destination side is the same diffusion code as used on the send side but is opposite in sign.

When the CDMA communication system is adopted, the allocation of individual diffusion codes to respective users can realize communication with each of the users.

Efficient utilization of multi-path is one characteristic feature of the CDMA communication system. In the case of radio communication, in addition to the case where the signal sent from the transmitter as such is straightly received by the receiver, there is a situation where the signal is diffracted or attenuated by objects which block off the signal, and a phenomenon called "fading" takes place upon the movement of the transmitter. When the diffraction takes place, a signal, which has passed through a plurality of paths, is received by the receiver. A signal, which has caused phase difference or time difference at the receipt time, is called "multi-path," and each received signal in the multi-path is called "path."

In TDMA (time division multiple access) and FDMA (frequency division multiple access) as other communication systems for sending a plurality of signals, when one signal in the multi-path is a main signal as a signal to be received, the other path signals are handled as noise which obstructs the main signal. In the CDMA communication system, however, the multi-path can be separated into individual paths all of which are handled as the main signal.

Figure 1:
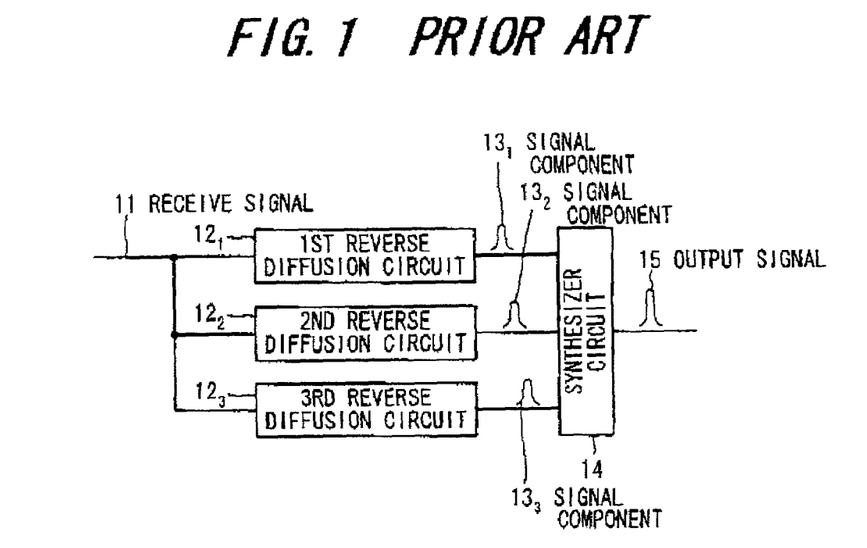
FIG. 1 is a block diagram showing the construction of a communication apparatus which performs rake receive.

FIG. 1 illustrates "rake receive" as a method for this purpose (rake received is discussed below). In this example, a receive signal 11 is input into each of first to third reverse diffusion circuits $12_1$ to $12_3$. These first to third reverse diffusion circuits $12_1$ to $12_3$ extract respective path signal components $13_1$ to $13_3$. A synthesis circuit 14 uses these signal components $13_1$ to $13_3$ as respective main signals and regulates the output timing of these components so as to match the output timing of one signal. As a result, an output signal 15, corresponding to the sum of the three signal components $13_1$ to $13_3$, is obtained from the synthesis circuit 14.

This technique, wherein the signal sent from the send side using the same diffusion code is collected in this way as if the signal is raked to enhance the receive sensitivity, is called "rake receive." Further, a circuit, which functions to detect the path of the received signal using the same diffusion code and to separate the path, is called a "searcher." Japanese Patent Laid-Open No. 4211/2000 discloses a circuit for the rake receive technique.

Figure 2:
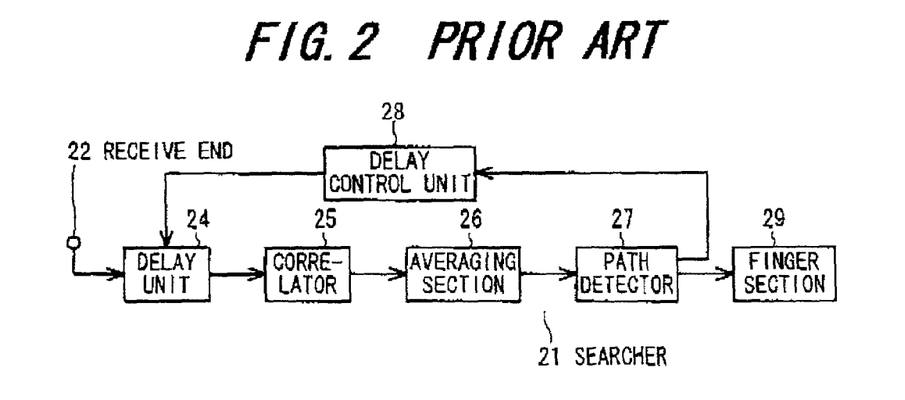
FIG. 2 is a schematic block diagram showing the construction of a searcher circuit in a conventional communication apparatus.

FIG. 2 is a schematic diagram showing the construction of a searcher circuit in a conventional communication apparatus. A searcher 21 comprises: a delay unit 24 which permits the input of a received signal 23 obtained from a receive end 22 and delays the received signal 23; a correlator 25 for examining the correlation of waveforms; an averaging section 26 for averaging delay profile representing the relationship between each receive timing of the receive signals and the correlation value; a path detector 27 for detecting a path; a delay control unit 28 for controlling the level of delay of the delay unit 24; and a finger section 29. In this searcher 21, a value of correlation with a pilot signal as a known signal contained in the received signal 23 is computed by means of the correlator 25 while shifting the delay level in the delay unit 24 by means of the delay control unit 28.

Figure 3A:
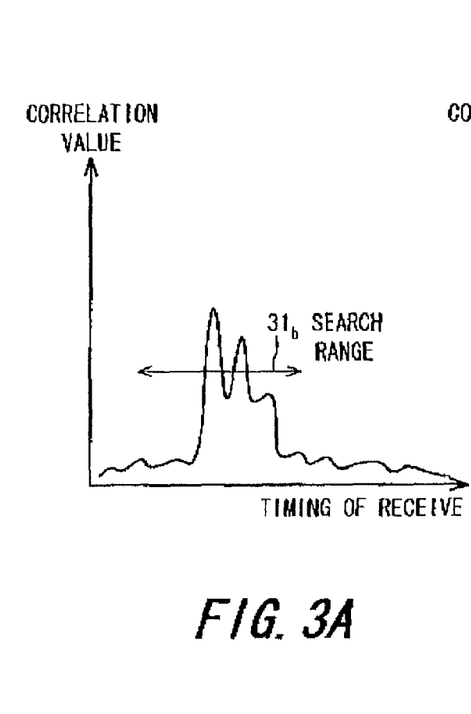
FIG. 3 is an explanatory view showing an example of a change in delay profile upon the movement of a mobile unit.
Figures 3B, 3C:
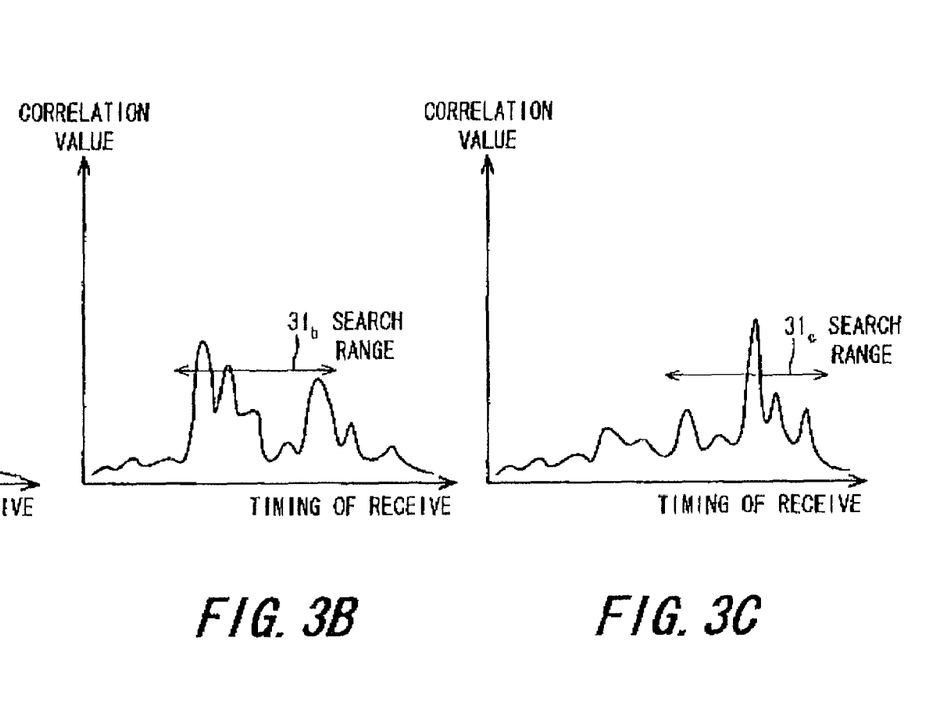

FIG. 3 shows an example of a change in delay profile upon the movement of a mobile unit. As a mobile unit such as a portable telephone (a cellular telephone) moves from FIG. 3A toward FIG. 3B and FIG. 3C in that order with the elapse of time, the relationship between the receive timing plotted as abscissa and the correlation value plotted as ordinate changes. In these drawings, arrows 31a, 31b, and 31c indicate a search range as the receive timing range for computing the correlation value.

Thus, the delay profile changes with the elapse of time upon a change in the position of the mobile unit. Therefore, the averaging section 26 shown in FIG. 2 averages a plurality of acquired delay profiles for enhancing the reliability of the path detection in the path detector 27. In fact, even in receive timing in which a path is absent, the correlation value becomes in some cases high as a probability event due to some cause. When this result as such is input into the path detector 27, a path is detected. This is causative of erroneous detection. The path detector 27 searches for receive timing having a high average correlation value in the delay profiles, and detects this as a path which is then notified to the finger section 29.

The cycle, at which path detection is carried out in the path detector 27, depends upon the number of delay profiles which are averaged by the averaging section 26. Specifically, when the number of delay profiles to be averaged is increased from the viewpoint of enhancing the reliability of the path detection, the cycle for the path detection is long. In the case of mobile communication, there is a possibility that the mobile unit moves with the elapse of time. As the mobile unit moves, the search range 31 shown in FIG. 3 changes.

On the other hand, the range which the correlator 25 can compute the correlation value at a time is limited by the restriction of hardware as the communication apparatus. In general, the correlation value computation range is several times the delay spread as the spread of the delay profile. Therefore, the searcher 21 cannot search at a time the whole range in which the mobile unit can exist. For this reason, the searcher 21 controls the delay control unit 28 so that, as indicated by arrows 31a, 31b, 31c shown in FIG. 3, the search range in terms of time range for computing the correlation value is moved according to the location at which the path exists at that time.

In the searcher 21 of the conventional communication apparatus, as described above, the path detection cycle cannot be satisfactorily shortened. This is because shortening the cycle has a fear that the reliability of the delay profile after the averaging in the averaging section 26 is lowered and erroneous path detection takes place. Therefore, disadvantageously, this cannot cope with ever-changing path position. Of course, the hardware can be improved so as to overcome this problem. This, however, poses problems of an increase in size of hardware and a significant increase in cost.

SUMMARY OF THE INVENTION

Accordingly, it is an object of the invention to provide a communication apparatus which can effectively perform path detection according to various conditions of signals received by a code division multiple access communication system.

According to the first feature of the invention, a communication apparatus comprises:

(i) signal receiving means for receiving a signal, sent from a single sender using a code division multiple access communication system as diffusion code multiplied signals, received at different times, in different time-based search ranges of a predetermined time interval based on a starting time of signal receipt;

(ii) correlation value computation means which computes a correlation value between i) the signals in each search range received by the signal receiving means and ii) a pilot signal used as a known signal by receiving a plurality of signals sent at different times from the sender and performing averaging of the received plural signals in each search range;

(iii) averaging times control means for setting the number of times of the signal averaging in such a manner that the number of times of signal averaging is smaller in a search range in which the correlation value computed by the correlation value computation means is higher;

(iv) path detection means which permits the input of the results of computation for each search range by the correlation value computation means and, when the signal sent from the sender is present in the search ranges, detects this signal; and (v) finger means for superimposing, in terms of waveform, paths detected by the path detection means on each other to regenerate the signal sent from the sender.

In the construction of the communication apparatus according to the first feature of the invention, the signal receiving means receives signals, from by a code division multiple access communication system, in search ranges of a predetermined time interval which are different from each other based on a starting time of signal receipt.

The correlation value computation means computes correlation values for each search range. The receipt of a plurality of signals sent at different times followed by averaging of these correlation values can enhance data reliability. The path detection means permits the input of the results of computation by the correlation value computation means and, when the signal sent from the sender is present in the search ranges, detects this signal. On the other hand, the averaging times control means sets the number of times of signal averaging in such a manner that the number of times of signal averaging is smaller in a search range in which the correlation value computed by the correlation value computation means is higher. By virtue of this, a change in receive timing in the search range, in which a path is present, can be quickly detected, and, in addition, in the search range in which the correlation value is low, the satisfactory number of times of averaging is ensured to enhance the reliability of the computed correlation values. This can enhance the path detection efficiency as compared with the case where the average of correlation values is determined in the same number of times of averaging for all the search ranges.

According to the second feature of the invention, a communication apparatus comprises:

(i) signal receiving means for receiving signals, sent by a code division multiple access communication system, in search ranges of a predetermined time interval which are different from each other in start timing of receive;

(ii) correlation value computation means which computes a value of correlation between the signal in each search range received by the signal receiving means and a pilot signal as a known signal by receiving a plurality of signals sent at different times from the sender and performing averaging in each search range;

(iii) search range width change means for combining a plurality of search ranges, in which the correlation value computed by the correlation value computation means is low, into one search range;

(iv) path detection means which permits the input of the results of computation for each search range, after change by the search range width change means, by the correlation value computation means and, when the signal sent from the sender is present in the search ranges, detects this signal; and (v) finger means for superimposing, in terms of waveform, paths detected by the path detection means on each other to regenerate the signal sent from the sender.

In the construction of the communication apparatus according to the second feature of the invention, the signal receiving means receive signals, sent from an identical sender by a code division multiple access communication system, in search ranges of a predetermined time interval which are different from each other in start timing of receive. The correlation value computation means computes correlation values for each search range. The receive of a plurality of signals sent at different times followed by averaging of these correlation values can enhance data reliability. The search range width change means combines a plurality of search ranges, in which the correlation value computed by the correlation value computation means is low, into one search range. Therefore, when the number of times of averaging in the combined portion is identical to the number of times of averaging in the uncombined portion, the time necessary for the averaging is larger by an extent corresponding to the combining-derived increase. However, data reliability can be ensured. Further, in the search range in which the correlation value is high, S/N is high and, in addition, data reliability is high. Therefore, in this search range, averaging correlation values can be carried out in a shorter time than that in the search range in which the correlation value is low. This can ensure quickness of search. Thus, the efficiency of the path detection per se can be increased while ensuring data reliability of the path detection.

In the communication apparatus according to the first or second feature of the invention, the signal receiving means preferably comprises a plurality of delay units different from each other in delay level to set a plurality of receive start timings.

According to this construction, in the communication apparatus according to the first or second feature of the invention, the receive start timings, which define respective search ranges, are realized by providing a plurality of delay units different from each other in delay level. As will be described later, the delay level of these delay units may be independently regulated.

In the communication apparatus according to the first or second feature of the invention, circuit devices for examining the correlation of received signals in the plurality of search ranges and performing path detection may be provided independently of each other, and, in this case, the number of circuit devices provided is the same as the number of search ranges.

According to this construction, in the communication apparatus according to the first or second feature of the invention, circuit devices are provided as hardware separately from each other respectively for different search ranges in respective routes.

In the communication apparatus according to the first or second feature of the invention, a pair of circuit devices for examining the correlation of received signals in a plurality of search ranges and performing path detection may be provided, and the processing of received signals may be carried out through time division by the number of times equal to the number of search ranges.

According to this construction, unlike the above embodiment wherein circuit devices are provided as hardwares separately from each other respectively for different search ranges, a pair of circuit devices for examining the correlation of received signals in a plurality of search ranges and performing path detection are provided, and the processing of received signals is carried out through time division by the number of times equal to the number of search ranges. This control can be carried out by software.

In the embodiment of the communication apparatus according to the first or second feature of the invention, wherein the signal receiving means comprises a plurality of delay units different from each other in delay level to set a plurality of receive start timings, the delay level may be variable according to the results of detection in the path detection means.

According to this construction, the search ranges can be shifted in the direction of the time axis.

BRIEF DESCRIPTION OF THE DRAWINGS

The invention will be explained in more detail in conjunction with the appended drawings, wherein.

DESCRIPTION OF THE PREFERRED EMBODIMENTS

Preferred embodiments of the invention will be explained in detail in conjunction with the accompanying drawings.

Figure 4:
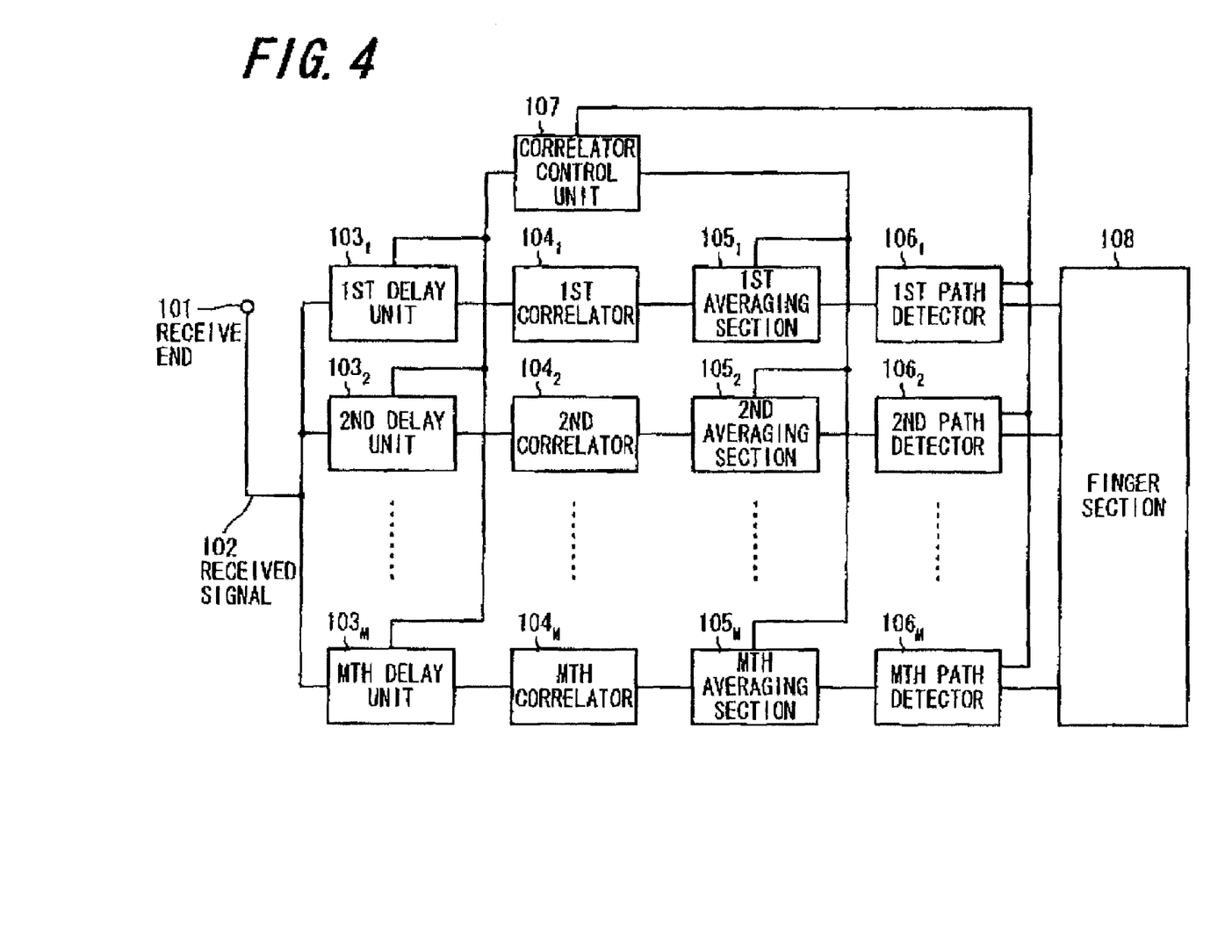
FIG. 4 is a block diagram showing the construction of a communication apparatus according to one preferred embodiment of the invention.

FIG. 4 shows the construction of a communication apparatus according to a preferred embodiment of the invention. Received signals 102, obtained in a receive end 101 of this communication apparatus, are diffusion code multiplied signals which have been sent from a sender (not shown) by a code division multiple access communication system and have been received by a single antenna (not shown).

The received signals 102 are input respectively into first to Mth delay units $103_1$ to $103_M$ which are disposed parallel to one another. In this case, the signal delayed by the first delay unit $103_1$ is input into a first correlator $104_1$ for correlation with the waveform of a known signal (a pilot signal).

A first averaging section $105_1$ for averaging delay profile is provided on the output side of the first correlator $104_1$.

The delay profile after averaging in the first averaging section $105_1$ is input into a first path detector $106_1$ for path detection.

The results are input into a correlator control unit 107 and, in addition, are input into a finger section 108.

The second to Mth delay units $103_2$ to $103_M$ also are connected in series in subsequent stage respectively to the second to Mth correlators $104_2$ to $104_M$, the second to Mth averaging sections $105_2$ to $105_M$, and the second to Mth path detectors $106_2$ to $106_M$. As with the first path detector $106_1$, the outputs of the second to Mth path detectors $106_2$ to $106_M$ are input into the correlator control unit 107 and, in addition, are input into the finger section 108. The correlator control unit 107 controls the first to Mth delay units $103_1$ to $103_M$ and the first to Mth averaging sections $105_1$ to $105_M$.

Thus, in the communication apparatus according to this preferred embodiment, a single correlator control unit 107 is provided for common use purposes, and searchers of the type shown in FIG. 2 are disposed respectively in M routes. The correlator control unit 107 further controls the first to Mth averaging sections $105_1$ to $105_M$.

Therefore, unlike the correlator 25 of the single route shown in FIG. 2, the correlators are divided into M routes of the first to Mth correlators $104_1$ to $104_M$. Thus, according to the communication apparatus of this preferred embodiment, as compared with the conventional one-route communication apparatus, the range of correlation computed by one correlator 104 can be reduced to one-Mth.

Figure 5:
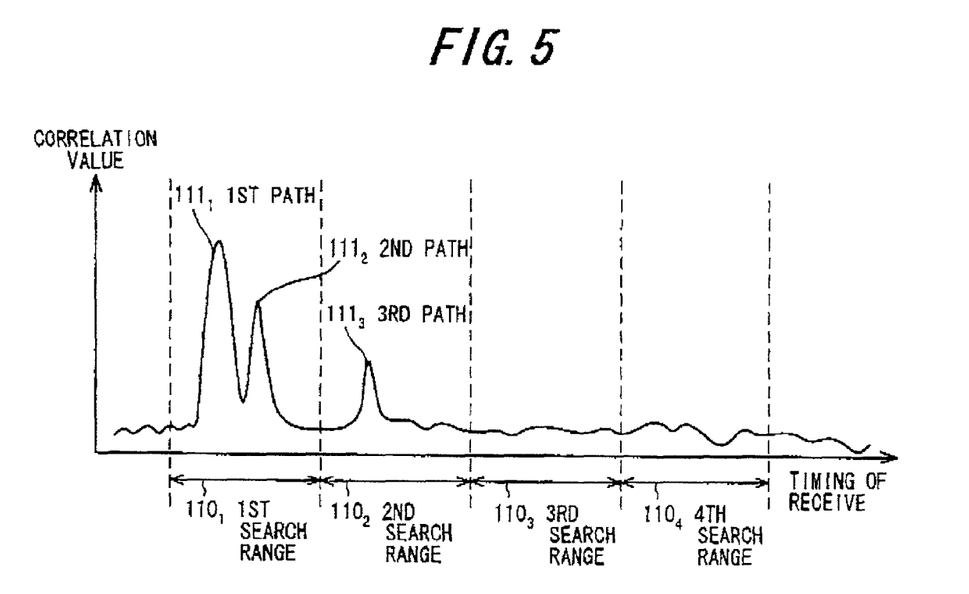
FIG. 5 is a waveform diagram showing an example of a delay profile and the computation range of correlation value by the first to Mth correlators in the preferred embodiment of the invention shown in FIG. 4.

FIG. 5 is a waveform diagram showing an example of a delay profile and the computation range of correlation value by the first to Mth correlators in the preferred embodiment of the invention shown in FIG. 4. Here M is "4." In this example, the first path $111_1$ and the second path $111_2$ are present as high S/N (signal-to-noise ratio) paths within the first search range $110_1$ for the computation of the correlation value in the first correlator $104_1$, and the third path $111_3$ is present as a high S/N path within the second search range $110_2$ in the second correlation $104_2$.

The first to Mth averaging sections $105_1$ to $105_M$ shown in FIG. 4 average delay profile outputs from the corresponding first to Mth correlators $104_1$ to $104_M$. The number of times of averaging is varied by the control of the correlator control unit 107. This will be explained later.

In the first to Mth path detectors $106_1$ to $106_M$, S/N is compared for the paths obtained in the first to Mth correlators $104_1$ to $104_M$. In high S/N correlator 104, the presence of the following characteristics is considered.

(a) An important path 111 is captured. Therefore, the highest possible accuracy path timing is to be determined. To this end, the number of times of averaging in the averaging section 105 should be reduced to shorten the path detection cycle.

(b) Since S/N is high, the reliability of delay profile obtained therefrom is high. Therefore, the number of times of averaging in the averaging section 105 can be reduced.

Accordingly, the correlator control unit 107 controls the averaging section 105 in the route of the high S/N correlator 104 so that the number of times of averaging is reduced. On the other hand, the correlator control unit 107 controls the averaging section 105 in the route of the low S/N correlator 104 so that the number of times of averaging is increased.

In the control of the correlator control unit 107, each S/N value is compared with a single or plurality of predetermined threshold values to judge to which group the S/N belongs. The number of times of averaging in the averaging section 105 may be set according to the group. Thresholds may be held in a table, and a proper value may be selected according to the status of the base station.

In this connection, in the correlator 104, the operation for the computation of correlation value by a pilot signal length is regarded as one operation. For example, in the leading signal of W-CDMA according to some proposal, each signal is divided into time slot units of 10/15 ms (milliseconds). In one time slot, the pilot signal becomes 10/15×[3/10, 4/10, 5/10, 6/10, 7/10, 8/10] ms depending upon various conditions. That is, the one operation unit of the correlator 104 represents determining values of correlation with the pilot signal of 10/15×[3/10, 4/10, 5/10, 6/10, 7/10, 8/10] ms according to the conditions. This is described in 3GPP (3rd Generation Partnership Project) TS 25.211 V3.1.1 (1999-12).

Figure 6:
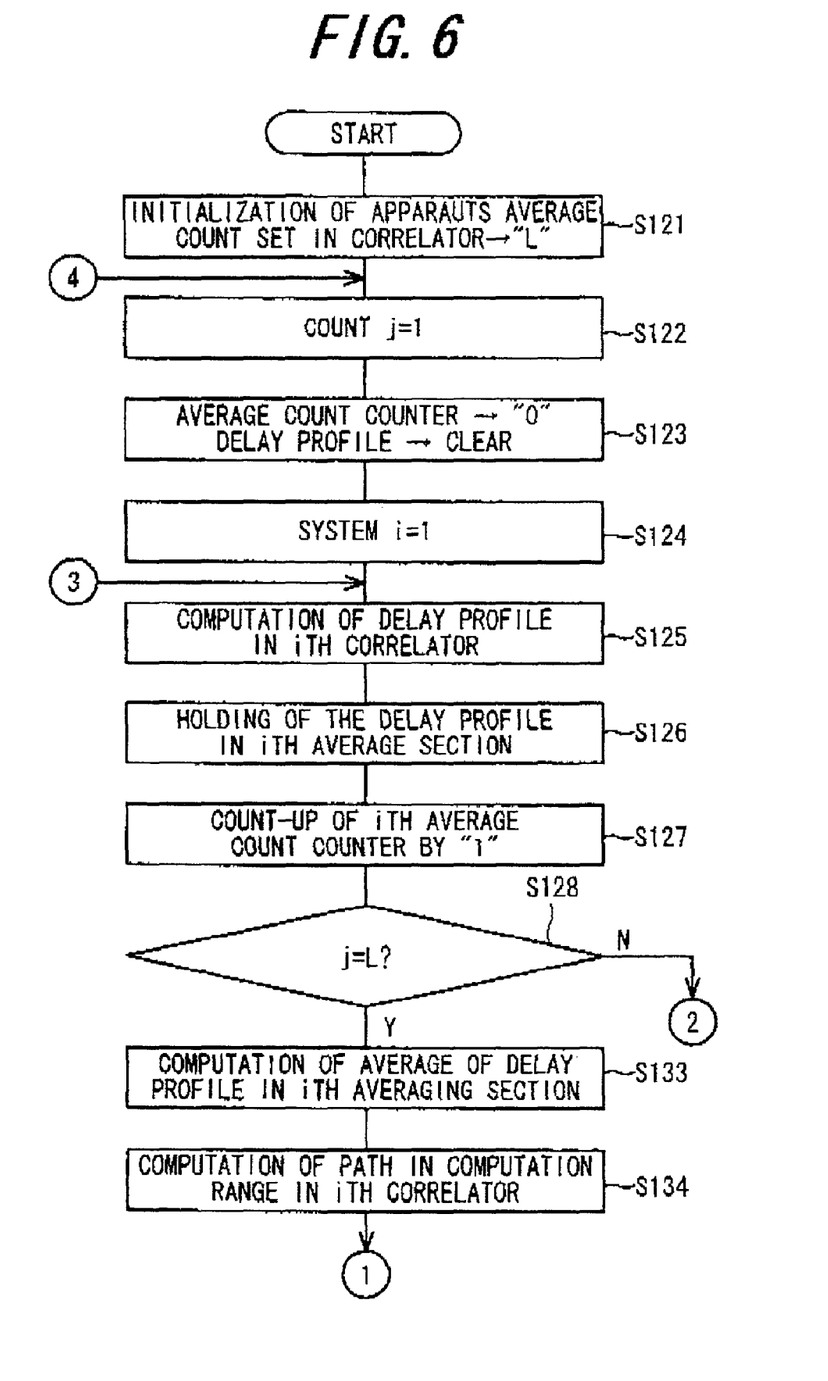
FIG. 6 is a flow diagram which specifically illustrates the first half of the flow of processing of the communication apparatus according to the preferred embodiment of the invention shown in FIG. 4.
Figure 7:
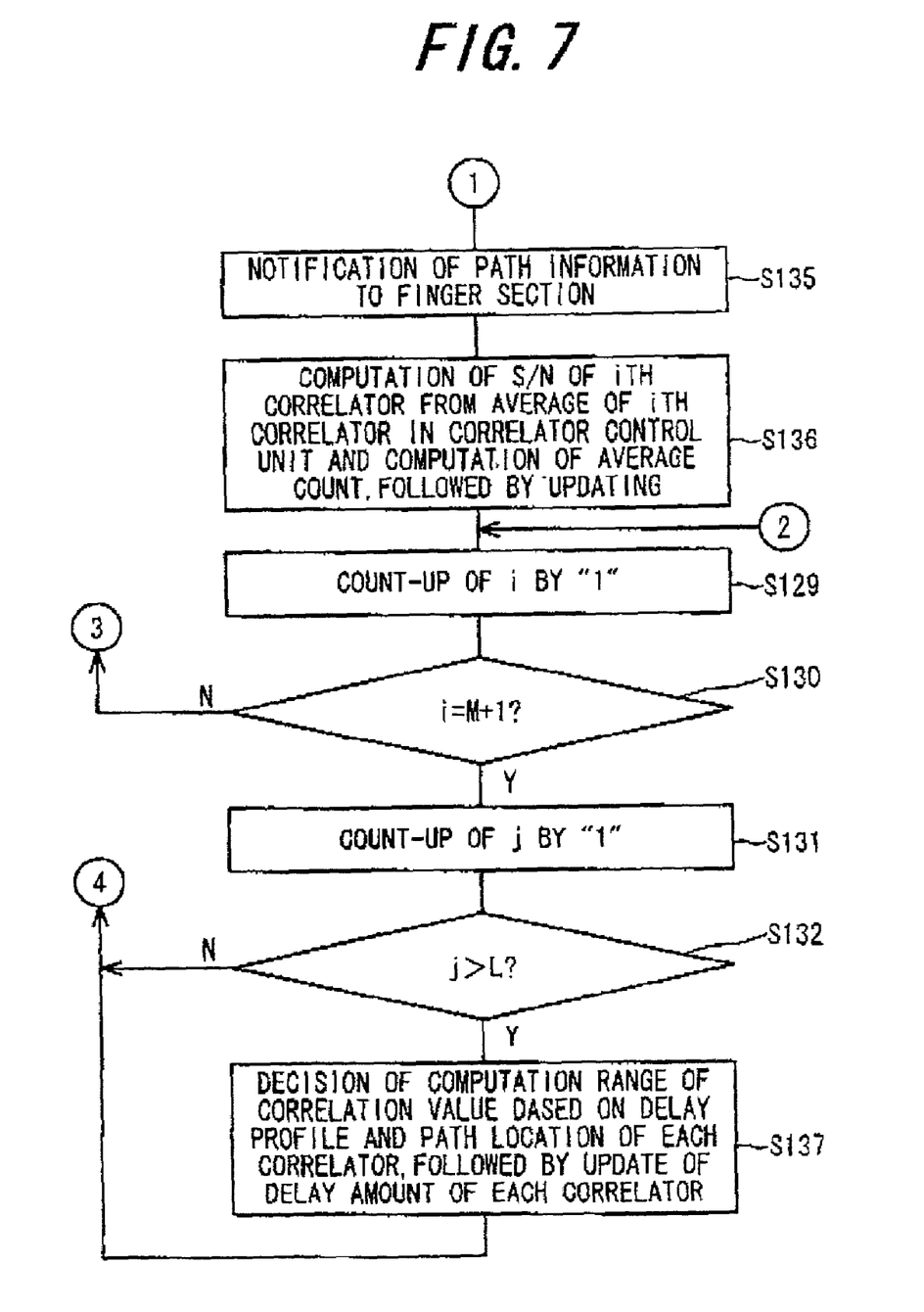
FIG. 7 is a flow diagram which specifically illustrates the second half of the flow of processing of the communication apparatus according to the preferred embodiment of the invention shown in FIG. 4.

FIGS. 6 and 7 specifically represent the flow of processing of this communication apparatus. Here an explanation will be made on an embodiment where M is "4," that is, the first to Mth correlators $104_1$ to $104_M$ are constituted by the first to fourth correlators $104_1$ to $104_4$. In this embodiment, it is assumed that each route (here each of the first to fourth routes) is realized by software. In this software processing, CPU (central processing unit) (not shown) within the communication apparatus executes a program stored, for example, in ROM (read only memory) (not shown) to use a pair of hardwares in a time division manner, thereby performing processing of each route.

At the outset, the communication apparatus sets the maximum value Lou of the number of times of averaging in each of the first to fourth correlators $104_1$ to $104_4$ (step S121 in FIG. 6). At that point, the value of correlation with the receive timing is not yet measured. Therefore, allowing for latitude in the measurement of the first to fourth correlators $104_1$ to $104_4$, the maximum value of the number of times of averaging L corresponding to the lowest correlation value is preset. In order to carry out the first measurement in this state, the number of times of measurement j is set to "1" (step S122). Thereafter, each value of the averaging times counter for managing the number of times of averaging the delay profile of the first to fourth correlators $104_1$ to $104_4$ is initialized to "0." Further, all the delay profiles held in the first to fourth averaging sections $105_1$ to $105_4$ are cleared (step S123) Next, in order to start the measurement of the first route, the value i indicating the route of the correlator 104 or the like is set to an initial value "1" (step S124).

Upon the completion of the above setting, a delay profile is computed by the ith, that is, the first correlator $104_1$ (step S125), and the delay profile is held in the first averaging section $105_1$ (step S126).

Thereafter, the count value of the first averaging times counter is counted up by "1" (step S127). This counted-up count value is checked for whether or not the count value is equal to the number of times of averaging L set in the first correlator $104_1$ (step S128). In this case, a check is made on whether or not the count value has reached the initially set maximum value $L_{MAX}$. Since the number of times of measurement j is "1," the count value does not reach the maximum value $L_{MAX}$ of the number of times of averaging L (N). Accordingly, the step is transferred to step S129 in FIG. 7 where the value i indicating the route is counted up by "1," followed by switching to route "i+1" (in this case, the second route) (step S129). In this status such that the same processing is not completed for all the routes (step S130: N), the step is returned to step S125, and the same processing as performed in the first route is applied. In the same manner, for the first to fourth correlators $104_1$ to $104_4$, the delay profile is computed one by one. These profiles are held respectively in the averaging sections $105_1$ to $105_4$ of the routes.

Upon the completion of the above processing (step S130: Y), the number of times j is counted up by "1." That is, the count value becomes "2" (step S131). A check is made on whether or not the counted-up number of times j has exceeded the maximum number of times of averaging L. When j does not exceed the maximum number of times of averaging L (step S132: N), the step is returned to step S122, and the first route is again set (step S124). The delay profile is computed in the first correlator $104_1$, and, in the same manner, the computed delay profile is held in the first averaging section $105_1$ (step S126). Thereafter, in the same manner as described above, the results of measurement of the second to fourth correlators $104_2$ to $104_4$ are held respectively in the second to fourth averaging sections $105_2$ to $105_4$. Thus, the second delay profile computation is carried out by the first to fourth correlators $104_1$ to $104_4$, and the results are held respectively in the averaging sections $105_1$ to $105_4$ of the routes.

Upon the completion of the second delay profile processing in this way, the third or later delay profile processing is carried out so far as the counted-up value j does not exceed the maximum number of times of averaging L. As a result, at some point, the number of times of averaging j for the first route reaches the initially set maximum value $L_{MAX}$ (step S128: Y). This indicates that the number of collected delay profiles of the first route has reached the number of delay profiles necessary at this first stage. Therefore, in this stage, the average of delay profiles for the first route is computed in the first averaging section $105_1$ (step S133). The results of computation are input into the first path detector $106_1$ where paths falling within the range computable in the first correlator $104_1$ are computed (step S134). In the embodiment shown in FIG. 5, the first path $111_1$ and the second path $111_2$ are computed by this operation. The path information detected by the computation is notified to the finger section 108 (step S135 in FIG. 7).

This path information is also notified to the correlator control unit 107. In the correlator control unit 107, S/N of the first correlator $104_1$ is computed from this average of the first correlator $104_1$, and, based on a previously prepared correspondence table (not shown) for S/N values, the number of times of averaging in the section computed by the first correlator $104_1$ is determined. The maximum value $L_{MAX}$ temporarily set for the first route is replaced by this number of times of averaging L (step S136).

Upon the completion of the processing for the first route in this way, the value "i" indicating the route is counted up by "1" (step S129). Until the value "i" exceeds the maximum value of the route (in this embodiment, "4") (step S130: N), the step is again returned to step S125, followed by the start of the same processing for the next route. In this initial state such that the number of times of averaging L for each of the first to fourth routes is not yet established, for the number of times of averaging L, the preset maximum value La is common to all the routes. Therefore, for the first route, the number of times of averaging L is determined based on the results of computation of S/N in the first correlator $104_1$, and is substituted for the maximum value $L_{MAX}$. In the same manner as described above, the number of times of averaging L is successively determined for the second to fourth routes, and these values L are substituted for the maximum value $L_{MAX}$.

It is assumed that the correlation value with each receive timing as shown in FIG. 5 has been determined. In this case, based on the results determined in the maximum number of times of averaging $L_{MAX}$, the smallest number of times of averaging L is set for the first route, and the next smallest number of times of averaging L is set for the second route. For the third route and the fourth route, no path is detected. Therefore, the number of times of averaging L for these routes is a large value which is equal to the maximum value $L_{MAX}$ or is relatively close to the maximum value Lab according to S/N of the corresponding correlator 104.

Thus, in the initial stage at which the power supply of the mobile unit is turned on, the computation of correlation value is carried out with the maximum allowance, and the number of times of averaging L based on the actual measurement of the first to fourth correlators $104_1$ to $104_4$ is computed for each of the routes. Upon the completion of all the computations (step S132: Y), the correlation value computation ranges for respective routes (first to fourth search ranges $110_1$ to $110_4$) are determined based on the delay profiles and locations of path 111 in the first to fourth correlators $104_1$ to $104_4$. The reason for this is as follows. Although the maximum value per se of the ranges computable respectively in the correlators $104_1$ to $104_4$ has been determined, shifting of the search ranges $110_1$ to $110_4$ of the routes to some extent based on the locations of actually computed individual paths $111_1$ to $111_3$ is in some cases necessary for processing, or convenient, for example, from the viewpoint of preventing the waveform showing a path from being cut into two parts. Upon the establishment of the search ranges $110_1$ to $110_4$ (see FIG. 5) of the routes, the delay level of the first to Mth delay units $103_1$ to $103_M$ (first to fourth delay units $103_1$ to $103_4$) shown in FIG. 4 is set, followed by setting of these regions (step S137).

Thereafter, based on the contents of setting explained above, path detection is carried out according to the number of times of computation of the correlation value in each of the routes. Specifically, the step is returned to step S122, and the value of the number of times j indicating the computation of correlation value is first initialized to "1," and, subsequently, in step S123, the values of the averaging times counters for managing the number of times of averaging the delay profiles in the first to fourth correlators $104_1$ to $104_4$ each are initialized to "0." In addition, all the delay profiles held in the first to fourth averaging sections $105_1$ to $105_4$ are cleared. This time, based on the individually set values of the number of times of averaging L respectively for the routes, the average of delay profiles is determined to perform path detection. Further, since the position of the path changes, for each measurement of the routes, the correlator 104 computes S/N, and the number of times of averaging is computed and is substituted as a new number of times of averaging L (step S136). Therefore, the path detection can always be efficiently carried out.

Variant of Invention

In the above preferred embodiment, the search range per se for the path detection has a fixed width, and the number of times of averaging in the averaging section 105 is reduced in the search range, in which a path having a high correlation value is preset, to shorten the path detection cycle and thus to enhance the response characteristics. On the other hand, in the search range in which such path is absent, the number of times of averaging in the averaging section 105 is increased to avoid the erroneous path detection caused, for example, by noise. In the variant of the invention which will be next explained, instead of the fixation of the search range width in the routes, search ranges, in which no path is present or the correlation values are low, are combined into one.

Figure 8A:
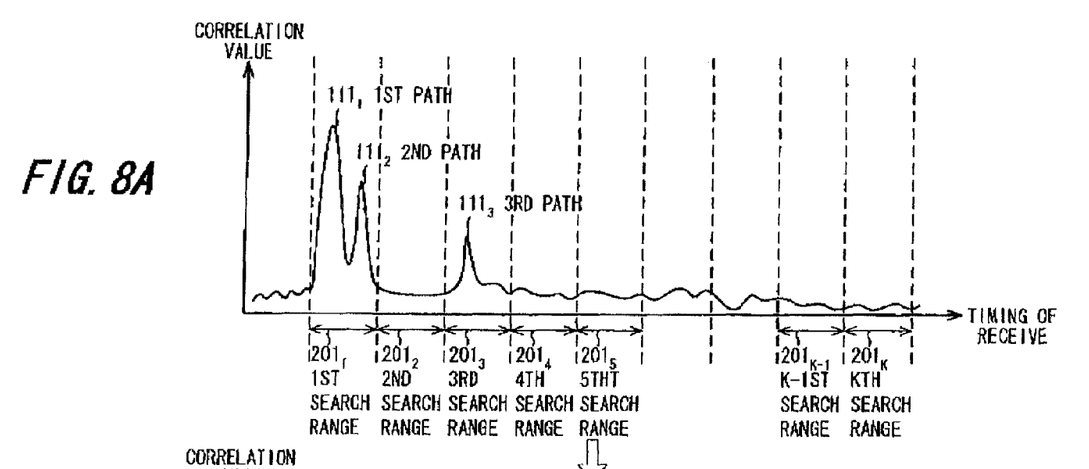
FIG. 8 is a waveform diagram showing the principle of a change in search range according to a variant of the invention.

FIG. 8 is a waveform diagram showing the principle of a change in search range according to this variant. In this variant, it is assumed that the circuit construction is as shown in FIG. 4, that is, is of M-route type having first to Mth correlators $104_1$ to $104_M$. As can be seen from FIG. 8A showing a state before reconfiguration, a numeric value K, which is larger than the numeric value M, is set as the number of routes. In this state, the correlation values are computed for the first to Kth search ranges $201_1$ to $201_K$, and paths 111 are computed. For each of the computed search ranges $201_1$ to $201_K$, the search ranges are reconfigured based on the following logic.

(1) Each of the search ranges $201_1$, $201_3$, wherein the path 111 has been detected, is handled as one search range unit even after the reconfiguration.

(2) Continued search ranges, wherein no path 111 has been detected, for example, search ranges $201_4$, $201_5$, . . . , are handled as search ranges wherein continued several ranges can be combined.

(3) The total number of search ranges after the reconfiguration is rendered equal to the numeric value M. In this connection, however, in such a case where a circuit is simply realized by software and a reduction in the number of routes does not cause waste in the circuit device, the total number of search ranges can be made smaller than the numeric value M.

Figure 8B:
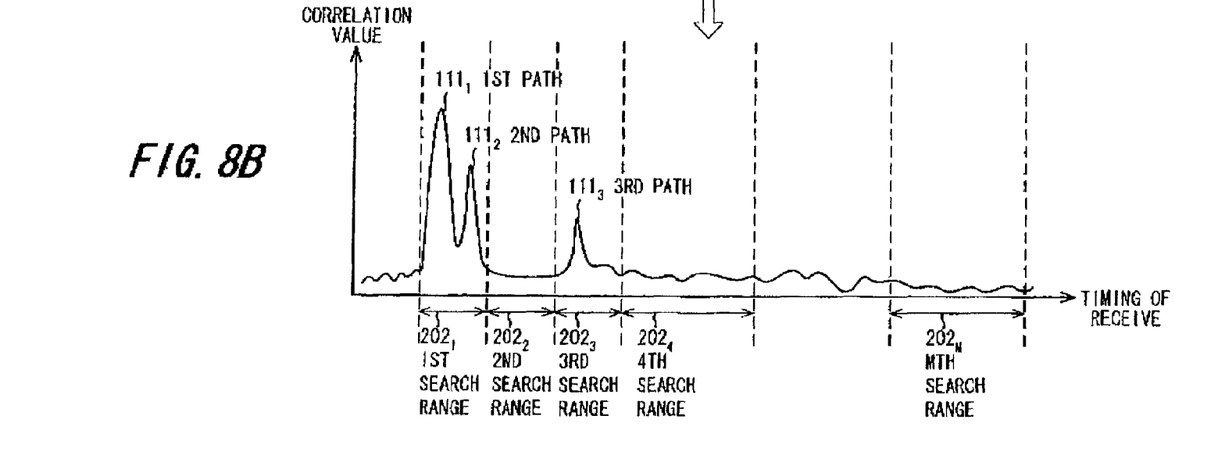

FIG. 8B shows the search range after the reconfiguration. In this embodiment, the search ranges $201_4$ and $201_5$ shown in FIG. 8A are combined into a search range $202_4$, and, for example, the search range $201_{K-1}$ and the search range $201_K$ are combined into the search range $202_M$. Thus, after the reconfiguration, the search range is of M-route type as a whole. This relatively narrows the range of search for the search ranges $202_1$, $202_3$, in which the path 111 is present, and thus can realize quick search. Further, for example, for each of the search range $202_4$ and the search range $202_M$, in this embodiment, two search ranges are combined into one. Therefore, when the computation of the average of the same number of delay profiles as the search ranges $202_1$, $202_3$ is contemplated, the time necessary for the computation is twice. Thus, weighted search can be realized according to the search ranges.

In this embodiment, each two search ranges free from path are combined into one. However, it is a matter of course that a larger number of search ranges are combined into one.

As is apparent from the foregoing description, according to the first feature of the invention and embodiments of the first feature of the invention, the averaging times control means sets the number of times of signal averaging in such a manner that the number of times of signal averaging is smaller in a search range in which the correlation value computed by the correlation value computation means is higher. By virtue of this, a change in receive timing in the search range, in which a path is present, can be quickly detected, and, in addition, in the search range in which the correlation value is low, the satisfactory number of times of averaging is ensured to enhance the reliability of the computed correlation values. This can enhance the path detection efficiency as compared with the case where the average of correlation values is determined in the same number of times of averaging for all the search ranges. Further, since the number of times of averaging necessary for each search range is ensured, no waste occurs in the scale of the hardware.

According to the second feature of the invention and embodiments of the second feature of the invention, the search range width change means combines a plurality of search ranges, in which the correlation value computed by the correlation value computation means is low, into one search range. Therefore, the portion, wherein the correlation value is high, can be processed in a relatively short time. This can offer a balance between data reliability and search quickness. Therefore, as compared with the case where circuit devices are simply provided for respective search ranges, no waste occurs in the hardware.

In the embodiment where, in the communication apparatus according to the first or second feature of the invention, circuit devices for examining the correlation of received signals in the plurality of search ranges and performing path detection are provided independently of each other, and the number of circuit devices provided is the same as the number of search ranges, as compared with processing through software, the processing speed can be increased.

Further, in the embodiment where, in the communication apparatus according to the first or second feature of the invention, a pair of circuit devices for examining the correlation of received signals in a plurality of search ranges and performing path detection are provided, and the processing of received signals is carried out through time division by the number of times equal to the number of search ranges, the cost of the whole communication apparatus can be reduced.

Furthermore, in the embodiment where, in the communication apparatus according to the first or second feature of the invention, the signal receiving means comprises a plurality of delay units different from each other in delay level to set a plurality of receive start timings, and the delay level is variable according to the results of detection in the path detection means, the search ranges can be shifted in the direction of the time axis. Therefore, the search of the necessary portion can be carried out. Further, complication of the processing can be avoided by performing processing in such a manner that one path does not extend over a plurality of search ranges.

The invention has been described in detail with particular reference to preferred embodiments, but it will be understood that variations and modifications can be effected within the scope of the invention as set forth in the appended claims.

What is claimed is:

1. A communication apparatus comprising:

signal receiving means for receiving a signal, sent from a sender by a code division multiple access communication system as diffusion code multiplied signals (102) comprising plural paths (111$_1$–111$_j$), the received signals being processed in different time-based search ranges of a predetermined time interval, which search ranges are different from each other based on a starting time of signal receipt;

correlation value computation means computing a correlation value between i) the signals in each search range received by the signal receiving means and ii) a pilot signal used as a known signal, the computation achieved by receiving a plurality of signals sent at different times from the sender and performing averaging of the received plural signals in each search range;

averaging times control means for setting the number of times of the signal averaging in such a manner that the number of times of the signal averaging is smaller in a search range in which the correlation value computed by the correlation value computation means is higher;

path detection means which permits the input of the results of computation for each search range by the correlation value computation means and, when the signal sent from the sender is present in the search ranges, detects this signal; and finger means for superimposing, in terms of waveform, paths detected by the path detection means on each other to regenerate the signal sent from the sender.

2. A communication apparatus comprising:

signal receiving means for receiving a signal, sent from a sender by a code division multiple access communication system, the signal received in time-based search ranges of a predetermined time interval based on a start of signal receipt;

correlation value computation means which computes a correlation value between i) the signal in each search range received by the signal receiving means and ii) a pilot signal as a known signal by receiving a plurality of signals sent at different times from the sender and performing averaging of the plural received signal in each search range;

search range width change means for combining a plurality of search ranges, in which the correlation value computed by the correlation value computation means is low, into one search range;

path detection means which permits the input of the results of computation for each search range, after change by the search range width change means, by the correlation value computation means and, when the signal sent from the sender is present in the search ranges, detects this signal; and finger means for superimposing, in terms of waveform, paths detected by the path detection means on each other to regenerate the signal sent from the sender.

3. The communication apparatus according to claim 1, wherein the signal receiving means comprises a plurality of delay units different from each other in delay level to set a plurality of receive start timings.

4. The communication apparatus according to claim 1, wherein, the correlation value computation means comprises circuit devices for examining the correlation of received signals in the plurality of search ranges, the path detection means comprises further circuit devices for performing path detection, and circuits and the further circuits are provided independently of each other, and the number of the circuit devices and the further circuit devices provided is the same as the number of search ranges.

5. The communication apparatus according to claim 1, wherein, for each search range there is provides a pair of circuit devices for examining the correlation of received signals and performing path detection, and the processing of received signals is carried out through time division by the number of times equal to the number of search ranges.

6. The communication apparatus according to claim 3, wherein the delay unit varies the delay level according to the results of detection in the path detection means.

7. A communication apparatus, comprising:
- a receive end that receives diffusion code multiplied signals (102) sent from a sender by a code division multiple access communication system, the received signals being in plural received paths ($111_1$–$111_i$);
- plural delay units ($103_1$–$103_M$), disposed parallel to one another, accepting the received signals based on time of signal receipt to define plural different time-based search ranges, and outputting respective delayed signals;
- a correlator (104i) connected to each delay unit ($103_i$) to receive, as an input, one outputted delayed signal for correlation with a waveform of a known signal, and to provide a delay profile of the received delayed signal;
- an averaging section ($105_i$) connected to an output of each correlator to receive, as an input, the outputted delay profile, and to average the received delay profile, an averaged delay profile being output from the averaging section;
- a path detector ($106_i$) connected to an output of each averaging section to receive, as an input, the averaged delay profile for path detection;
- a correlator control unit (107) connected to outputs of each path detector to receive, as inputs, results of the path detectors, the correlator control unit connected to control each delay unit and each averaging section; and
- a finger section (108) connected to outputs of each path detector to receive, as inputs, the results of the path detectors.

8. The communication apparatus of claim 7, wherein, wherein the correlator control unit (107) varies a delay level of each delay unit based on the results of the path detectors.

9. The communication apparatus of claim 7, wherein,
- a first path ($111_1$) of the received paths and a second path ($111_2$) are present as high signal-to-noise ratio paths within a first search range ($110_1$) for computation of a correlation value in the first correlator ($104_1$), and
- a third path ($111_3$) is present as a high signal-to-noise ratio path within the second search range ($110_2$).

10. The communication apparatus of claim 7, wherein, each averaging sections ($105_1$–$105_M$) averages the received delay profile output, a number of times of averaging within each averaging section is varied by control from the correlator control unit (107).

11. The communication apparatus of claim 10, wherein, the correlator control unit reduces the number of times of averaging as detected signal-to-noise ratio within a corresponding correlator increases.

12. The communication apparatus of claim 11, wherein, the correlator control unit increases the number of times of averaging as detected signal-to-noise ratio within the corresponding correlator decreases.

13. The communication apparatus of claim 7, wherein,
the apparatus comprises four delay units, four correlators, four averaging section, and four path detectors, the four path detectors commonly connected to the correlator control unit (107).

14. The communication apparatus of claim 7, wherein,
the time-based search ranges of the plural delay units ($103_1$–$103_M$) are variable under control of the correlator control unit.

* * * * *